Figure 1:
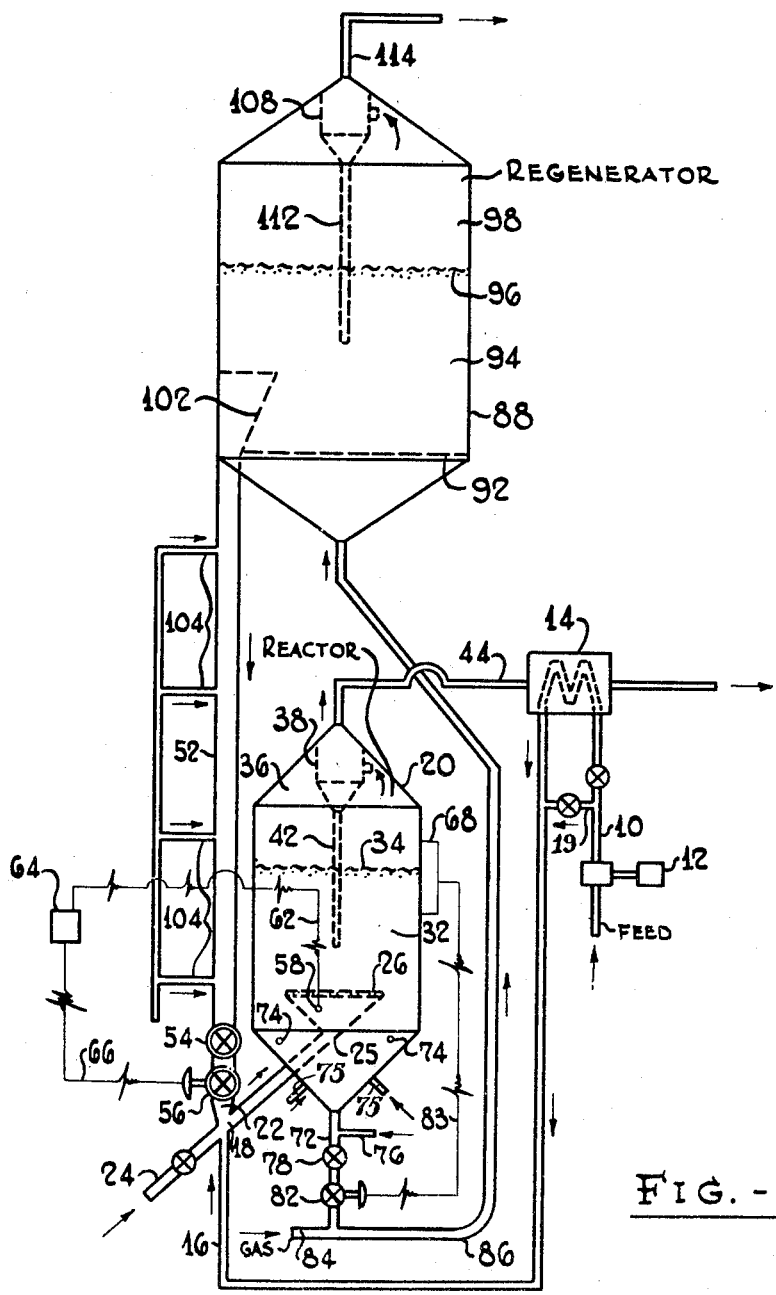

March 30, 1948. C. W. TYSON 2,438,728
TEMPERATURE CONTROL IN FLUIDIZED CATALYST SYSTEMS
Filed June 10, 1944 2 Sheets-Sheet 1

Charles W. Tyson Inventor
By _____ Attorney

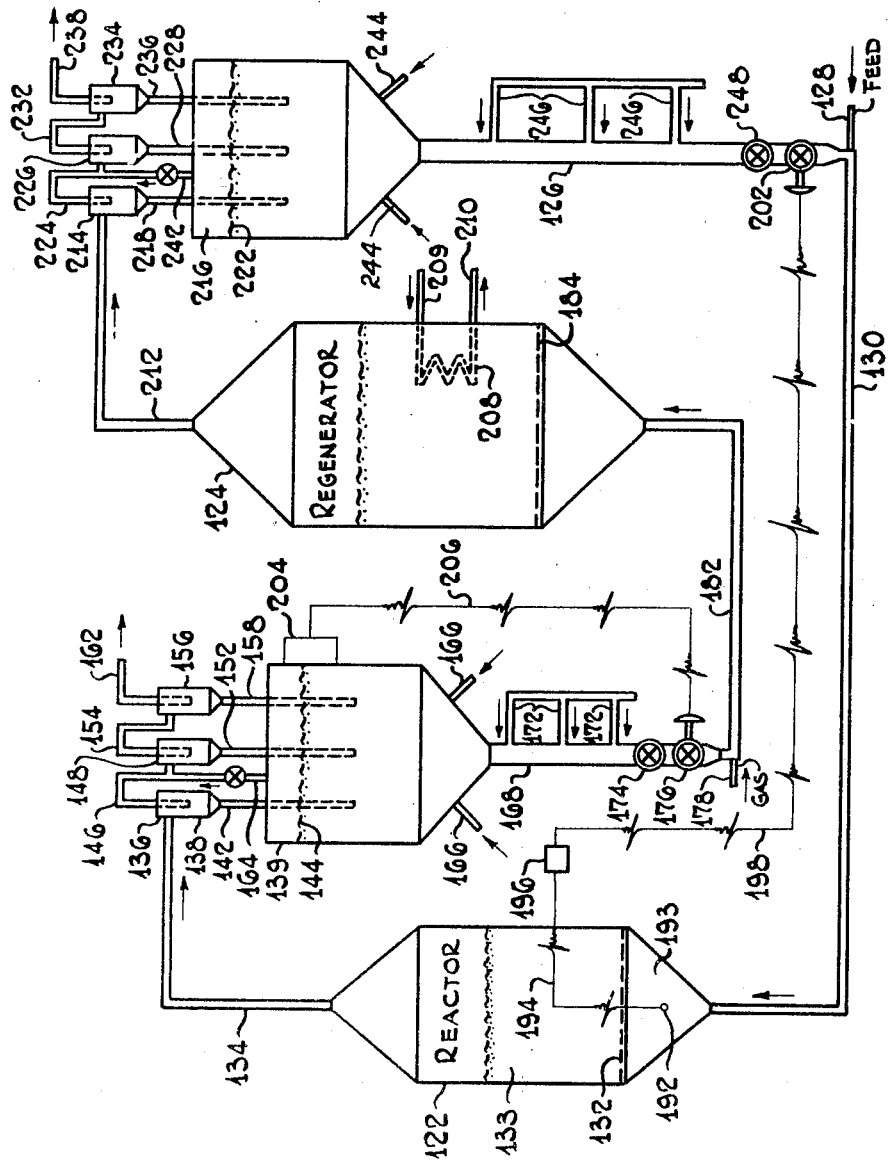

Patented Mar. 30, 1948

2,438,728

UNITED STATES PATENT OFFICE 2,438,728

TEMPERATURE CONTROL IN FLUIDIZED CATALYST SYSTEMS

Charles W. Tyson, Summit, N. J., assignor to Standard Oil Development Company, a corporation of Delaware Application June 10, 1944, Serial No. 539,705

17 Claims. (Cl. 196—52)

This invention relates to chemical reactions, and more particularly, relates to the conversion of hydrocarbons using powdered catalyst or catalyst in subdivided form or contact material in subdivided form.

When carrying out chemical reactions in the presence of solid catalyst or contact particles, it is necessary to control the temperature of the reaction and to control the amount of catalyst or contact particles going to the reaction zone. In reactions in which the catalyst or contact particles are fouled or contaminated with burnable or carbonaceous deposits in the reaction zone, it is necessary to regenerate the catalyst or contact particles in any suitable manner as by burning with air or other oxygen-containing gas before using the catalyst or contact particles in another reaction step. The hot regenerated catalyst or contact particles are then returned to the reaction or conversion zone.

In the catalytic cracking of hydrocarbons to form motor fuel or aviation gasoline, it is important to maintain constant operating conditions in order to obtain the greatest production of gasoline and other valuable products. The cracking operation is endothermic and hot regenerated catalyst or contact particles supply some of the heat of reaction, and where liquid oil feed is used, the hot regenerated catalyst or contact particles supply heat of vaporization and heat of cracking in the reaction or conversion zone.

During the catalytic cracking of hydrocarbons, it is important to maintain a certain ratio of catalyst to oil in order to obtain the desired conversion.

There are, broadly, two types of units using powdered or finely divided contact material, one being upflow fluid catalyst plants, that is, where the catalyst particles and vaporous reactants or regenerating gas flow concurrently upwardly through the reaction zone and through the regeneration zone. The catalyst is separated from the reaction products and passed to a spent catalyst standpipe from which the catalyst is passed to the regeneration zone and regenerated catalyst is passed to a regenerated catalyst standpipe from which it is fed to the reaction zone. The standpipes are provided with slide valves for controlling the rate of withdrawal of catalyst particles from the bottom portion of the standpipes.

The other type of unit is the downflow or bottom draw-off unit where catalyst or contact material in a dense phase or condition is withdrawn from the bottom portion of the reaction zone through a spent catalyst standpipe, or from the bottom portion of the regeneration zone through a regenerated catalyst standpipe while the vaporous reaction products or regeneration gas passes overhead with only a small amount of entrained contact particles. The bottom draw-off unit requires less separating means than the upflow unit, and due to the design, also requires less equipment. The standpipes for the bottom draw-off unit are also provided with slide valves for control.

This invention is concerned with the control of fluid catalyst units in which the operating conditions are maintained substantially constant.

In the control of upflow fluid catalyst units use has been made of a Venturi tube to control the amount of regenerated catalyst being fed to the reactor. This Venturi tube has been placed at the reactor outlet and has been subject to changes in reading due to other causes than catalyst feed to reactor. For instance, a change in degree of cracking or a change in pressure or oil feed rate will alter the reading of the venturi which is intended to maintain a substantially constant catalyst rate. This results in uneven flow of regenerated catalyst to the reactor and uneven conversion of hydrocarbons in the reactor. In this particular instance this condition is aggravated by a small increase in oil feed rate which will actually tend to decrease the catalyst to oil ratio, whereas an increase in catalyst to oil ratio would be preferred. The flow of spent catalyst to the regenerator is controlled by the level in the spent hopper and this method has proved satisfactory.

Another method for controlling the flow of catalyst comprises measuring the pressure differential in the line between the spent catalyst slide valve and the regenerator. Other things being equal, this pressure differential is a direct measurement of flow of catalyst. However, under certain conditions this pressure differential will be altered by variables, such as the fineness of catalyst, the amount of carbon in the catalyst, as well as the temperature and pressure of operation. Accordingly, some undesirable variation in catalyst rates has been observed when using this control means.

In the downflow fluid catalyst units it was expected to use the latter type of control; that is, the flow of regenerated catalyst was to be controlled by the level in the reactor and the flow of spent catalyst was to be controlled by the pressure differential in the line carrying the spent catalyst to the regenerator. This method did not prove satisfactory for the same reasons enumerated in the paragraph above and accordingly the unit was operated by maintaining a constant setting on the spent catalyst slide valve controlling the reactor level by the flow of regenerated catalyst. This method of operation, while fairly satisfactory, would cause considerable variation in conditions inasmuch as an increase in reactor pressure, due perhaps to increase in cracking, would tend to increase the catalyst flow rate due to a higher pressure in the reactor vessel with a fixed setting of the slide valve. This, in turn, tended to aggravate the condition.

Another method for controlling the amount of cracking in the downflow units consisted in varying the level in the reactor to maintain constant regenerator temperature. Since these units are not provided with auxiliary cooling means, regenerator temperature is a function of the amount of carbon deposited which in turn is a function of the degree of cracking. Accordingly, if the regenerator temperature is too low, a rise in level of the catalyst in the reactor will tend to compensate for it. This method of control, however, is rather slow in operation since it must await the results of a change before a resetting of the control instrument can be obtained.

It is the purpose of this invention to provide a satisfactory method for control of fluid catalyst units. This is accomplished by controlling the reactor inlet temperature by means of the amount of regenerated catalyst allowed to flow into the reactor. The level of catalyst in the reactor in a bottom draw-off unit is controlled by the opening or closing of the spent catalyst slide valve. Since the first of these controls depends upon heat balance which operates immediately and the second on the level of catalyst in the reactor vessel which is immediately apparent, the control is rapid in operation and has proven satisfactory. In order that the control operate in a satisfactory manner, it is necessary to provide constant preheat for the oil entering the cracking unit. However, this may be done satisfactorily with the means readily available.

This same type of control may be adapted to the operation of the upflow units by controlling the reactor inlet temperature by the amount of regenerated catalyst fed to the reactor and by controlling the spent catalyst hopper level by the operation of the spent catalyst slide valve located in the standpipe associated with spent catalyst hopper.

In the drawings,

Fig. 1 represents a downflow fluid unit which may be used in carrying out my invention; and Fig. 2 represents an upflow fluid unit which may be used in carrying out my invention.

Referring now to the drawing, the reference character 10 in Fig. 1 designates a line through which the reactant is passed by means of pump 12. The reactant is preferably passed through an indirect heat exchanger 14 or other indirect heat exchange equipment, such as a furnace or liquid to liquid heat exchange, and the partly preheated reactant is then passed through line 16 into line 18 which leads to a reaction zone presently to be described. If desired, a part or all of the reactant may be bypassed around heat exchanger 14 through line 19 and then passed through line 16 to the line 18 to maintain a substantially constant preheat temperature of the reactant. Use may be made of heat exchanger bypasses or furnace firing rate to maintain a constant reactant preheat temperature.

Instead of using the heat exchanger 14, heat may be supplied to the reactant by passing the reactant through an indirect heat exchanger where it is in indirect heat exchange with hot oil circulated through the bottom portion of the fractionator or bubble tower, the oil being used for desuperheating the reaction product vapors from reaction vessel 20 in the bottom portion of the fractionator.

In line 18 the reactant is mixed with regenerated catalyst or contact particles introduced into line 18 through line 22. The reactant may be in heated vapor or gaseous form or it may be partly preheated liquid in which case the heat necessary to vaporize the liquid and carry out the reaction is provided by the hot regenerated catalyst from line 22.

In the catalytic conversion of hydrocarbons, the reactant passing through line 10 may be a hydrocarbon oil such as gas oil, light gas oil, heavy gas oil, naphtha, reduced crude, or other suitable hydrocarbon stock to be converted. The catalyst is a suitable conversion catalyst. In the catalytic cracking of hydrocarbons the catalyst may be acid-treated bentonite clay or synthetic silica alumina or silica magnesia gels, etc. When reforming naphthas, reforming catalysts, such as alumina supported group VI metals, or cobalt, nickel, iron, or compounds of group VI oxides with nickel, cobalt or iron, may be used. The catalyst is preferably in powdered or finely divided form having a size ranging from a few microns to 100 mesh but coarser catalyst may be used if desired. If the catalytic cracking of hydrocarbons about one to 30 parts of catalyst to one of oil by weight may be used.

Where the oil feed is in vapor form it may be introduced through line 24 at about the point where the catalyst passes from line 22. Where the oil feed is in liquid form or partly in liquid and partly in vapor form, a gas, such as a hydrocarbon gas or, in some instances, steam, may be introduced through line 24 to prevent the catalyst or contact particles from packing below the point of introduction of oil or liquid reactant through line 16.

The mixture of catalyst or contact particles and reactant passes into the bottom portion of reaction vessel 20 through line 18 and inlet cone 25 and through distributor head 26, the cone 25 and head 26 being arranged in the lower portion of a reaction vessel 20. The distributor head 26 is provided with a plurality of holes for distributing the catalyst particles and reactant across the area of the reaction vessel. The velocity of the reactant vapors or gases passing through the reaction vessel 20 is so selected that the contact particles are maintained as a dry fluidized bed 32 having many of the characteristics of a liquid. The fluidized bed 32 has a level indicated at 34 and will have a density in the range of 5–50 lbs./cu. ft. depending on the catalyst and conditions of operation. The zone 36 above the fluidized bed will have density between 0.001 and 0.10 lb./cu. ft. also depending on the catalyst and conditions in the zone. The height of bed 32 may be varied as desired. A superficial velocity of about 0.2 ft. to 2.0 ft./second may be used where the catalyst is in powdered form and comprises acid-treated bentonite or silica alumina gel. The temperature during the conversion of hydrocarbons in the reaction vessel 20 is about 700° F. to 1000° F. when higher boiling hydrocarbons are catalytically cracked to produce motor fuel or aviation gasoline.

The reaction products in vapor form leave the fluidized bed 32 and pass into the upper portion 36 of the reaction vessel 20, the upper portion being referred to as dilute phase, which means that only a small amount of catalyst or contact particles are suspended in the vapors or reaction products. The vaporous reaction products pass through separating means 38 arranged in the upper part of the reaction vessel 20. The separating means 38 is shown in the drawing as a Multiclone separator but may be any suitable form of separator, such as, for example, one or more cyclone separators. The separating means 38 functions to separate most of the entrained catalyst or contact particles from the reaction vapors and the separated catalyst particles are returned to the bed of fluidized material 32 through dip pipe 42 which extends below the level 34 of the fluidized bed.

If desired, the catalyst particles collecting in the separating means 38 may be fluidized by the injection of a fluidizing gas to maintain the particles in fluidized condition. The reaction products leave the separating means 38 through line 44 and may be passed, if desired, through the indirect heat exchanger 14 for supplying some of the heat to the reactant passing through line 10. The reaction products are then passed to a fractionating system or other suitable means for separating the desired products. Any entrained catalyst or contact particles in the vaporous reaction products are scrubbed out by the condensate liquid in the bottom of the fractionating tower.

Hot regenerated catalyst particles are supplied through the line 22 and 18 from standpipe 52 provided with shut-off valve 54 and a control slide valve 56. It is important to control the temperature or to maintain the temperature substantially constant during the catalytic cracking of hydrocarbons, and this is done by first controlling the amount of hot regenerated catalyst being passed to the reaction vessel 20. The temperature at the reaction vessel inlet is taken by a temperature responsive device, such as a thermocouple, 58 which is connected through means 62 to a control device 64. Control device 64 may be any well known temperature control device for actuating the slide valve 56 by a connecting means 66 to maintain a constant temperature at point 58.

Preferably the thermocouple 58 is arranged in the inlet cone 25 as shown in the drawing because the change in temperature at a point in the inlet cone 25 is more rapidly responsive than one in the reaction vessel 20 due to the larger heat capacity of the catalyst mass 32 in the vessel 20. However, the thermocouple 58 may be placed above distribution plate 28 and improved operation obtained with this form of my invention.

If the temperature at the reaction vessel inlet decreases, the control means 64 and 66 are actuated to increase the amount of hot regenerated catalyst going to the reaction vessel 20 to bring the temperature back to the desired level. If the temperature at the reaction vessel inlet or thermocouple 58 is too high, the control means is actuated to cut down on the amount of hot regenerated catalyst passing to the reaction vessel 20.

When the amount of catalyst or contact particles passing to the reaction vessel 20 is changed, the level 34 also tends to change, and to maintain the level 34 substantially constant, a level control device 68 is used. This control device may be any suitable instrument, such as any well known differential pressure controller. The level control means 68 is associated with the slide valve in the standpipe 72 for withdrawing spent catalyst from the bottom of the reaction vessel 20 as will be presently described.

The catalyst or contact particles are withdrawn from the lower portion of the dense fluidized bed 32 into the bottom portion or hopper of the reaction vessel 20. Stripping gas is introduced through lines 74 below the distributor head 26 for removing volatile material from the contaminated catalyst or contact particles. Fluidizing gas may also be introduced through lines 75 into the bottom portion of the reaction vessel 20 to maintain the contaminated catalyst or contact particles in a fluidized condition so that they flow from the hopper into the standpipe 72. Fluidizing gas is preferably introduced through line or lines 76 for maintaining the catalyst particles in fluidized condition in the standpipe 72 so that the particles behave like a liquid and produce a hydrostatic pressure at the base of the standpipe 72.

The standpipe 72 is provided with a shut off valve 78 and a control slide valve 82. The level controller 68 above referred to is connected with a slide control valve 82 by means diagrammatically shown at 83. As the level 34 rises, the level controller 68 actuates the slide control valve 82 to open the slide valve to a greater extent and permit more spent catalyst to be withdrawn from the bottom of the vessel 20. If the level 34 falls down or decreases, the level control 68 moves the control slide valve a certain amount toward the closing position to cut down on the amount of spent catalyst being withdrawn from the bottom of the vessel 20.

The spent or contaminated catalyst particles passing through control valve 82 are mixed with air or other regenerating gas introduced through line 84 and the less dense mixture is passed through line 86 into the bottom of a regeneration vessel 88 below the distribution grid 92 in the bottom portion thereof. The distribution member 92 functions to distribute the catalyst or contact particles and the regenerating gas across the area of the regeneration vessel.

The reaction vessel 20 in its upper portion operates under a slight superatmospheric pressure, preferably below 100 lbs./sq. in., to enable the reaction products to be passed through the fractionating equipment. The dense fluidized bed 32 of catalyst or contact particles in the reaction vessel 20 and the dense fluidized particles in the standpipe 72 function similarly to a liquid to produce hydrostatic pressure at the bottom of the standpipe 72. The hydrostatic pressure so produced plus the back pressure in the reaction vessel 20 is sufficient to move the less dense catalyst mixture through the slide valve 82, line 86 and into the regeneration vessel 88.

The velocity of the regenerating gas is so selected that the catalyst particles undergoing regeneration are maintained as a fluidized bed as shown at 94 having a level at 96. The fluidized bed 94 is the relatively dense phase and the phase above the dense phase shown at 98 is the dilute phase in which there is only a small amount of catalyst particles suspended in the regeneration gases. Regenerated catalyst particles are withdrawn from the lower portion of the dense bed 94 through funnel shaped member or hopper 102 from which the fluidized dense mixture flows into the standpipe 52 above referred to. Fluidizing lines 104 are provided for introducing fluidizing gas at spaced intervals in the standpipe 52 to maintain the particles in fluidized condition so that they exert a hydrostatic pressure at the base of the standpipe 52. The pressure so produced is sufficient to force the regenerated catalyst particles through the slide valve 56 and into the reaction vessel 20.

The regeneration gases pass upwardly through the regeneration vessel 88 and pass from the dense phase or bed 94 into the upper portion or less dense phase 98. When using powdered synthetic silica alumina gel catalyst, the density of bed 94 is about 10 lbs./cu. ft. to 40 lbs./cu. ft. and the density of the dilute or less dense phase 98 is about 0.001 lb./cu. ft. to 0.100 lb./cu. ft. The regeneration gases are then passed through separating means 108 which is shown as a Multiclone separator arranged in the upper part of the regeneration vessel 88. Varied other forms of separating means may be used such as one or more cyclone separators or the like. The separated regenerated particles are returned to the dense bed 94 by dip pipe 112 extending from the separating means 108 to a point below the level 96 in the regeneration vessel 88.

The hot regeneration gases leave the regeneration vessel 88 through line 114. As the regeneration gases are at a high temperature, they are preferably passed to a waste heat boiler (not shown) for recovering some of the heat from the gases. The cooled regeneration gases are then passed to an electrical precipitator (not shown) or other dry separating equipment wherein most of the entrained catalyst particles are recovered. Oil or other liquid scrubber may be used if desired.

Referring now to Fig. 2 of the drawing, the reference character 122 designates a reaction vessel and the reference character 124 designates a regeneration vessel. The apparatus shown in Fig. 2 represents an upflow unit in which all of the catalyst and vapors or gases pass upwardly through the reaction zone and the regeneration zone. All of the catalyst or contact particles pass overhead from the reaction vessel 122 with the vaporous or gaseous reaction products and all of the regenerated catalyst or contact particles pass overhead from the regeneration vessel 124 with the regeneration gases.

Regenerated catalyst from standpipe 126 is mixed with heated reactant, such as hydrocarbon vapors in the temperature range of 400° F. to 1000° F. which are introduced through line 128, and the mixture passed through line 130 below distribution plate 132 in the reaction vessel 122. The reactant may comprise hydrocarbons which are to be converted or cracked but other reactants may be used and other reactions may be carried out. The velocity of the reactant vapors or gases is so selected that the catalyst particles are maintained in a fluidized turbulent condition as shown at 132 in the vessel 122. The superficial velocity for maintaining the particles in a fluidized dense condition may vary between about 0.2 ft./second and 10 ft./second. Under some conditions a level of dense fluidized catalyst will be maintained in the reaction vessel 122.

In the catalytic conversion of hydrocarbons, the hydrocarbon may comprise a hydrocarbon oil, such as gas oil, light gas oil, heavy gas oil, naphtha, reduced crude, or other hydrocarbon stock to be converted. The catalyst is a suitable conversion or cracking catalyst. In the catalytic cracking of hydrocarbons, the catalyst may be acid-treated bentonite clays or synthetic silica alumina or snythetic silica magnesia gels, etc. When reforming naphthas, reforming catalysts above given in connection with the description of Fig. 1 may be used. The catalyst or contact material is preferably in powdered form having a size of from a few microns to 100 standard mesh but coarser particles may be used if desired. In the catalytic cracking of hydrocarbons, about one part of catalyst to one of oil to about 15 parts of catalyst to one part of oil by weight may be used. The temperature during cracking is about 700° F. to about 1000° F., but higher or lower temperatures may be used for other reactions.

The fluidized catalyst or contact mixture in the vessel 122 when using powdered synthetic silica alumina gels has an average density of about 5 lbs./cu.ft. to about 40 lbs./cu.ft. When using powdered acid - treated bentonite clays about the same densities are obtained.

The reaction products in gaseous form leave the reaction vessel 122 through line 134 together with entrained catalyst or contact particles. The reaction products are first passed to a cyclone separator 136 in which the bulk of the catalyst or contact particles is removed from the gaseous reaction products. The separate catalyst particles collect in the bottom of the separator at 138 and are passed to a spent catalyst hopper 139 by means of dip pipe 142 which dips below the level 144 in the spent catalyst hopper 139. The reaction vapors leave the first cyclone separator through line 146 and are passed to a second cyclone separator 148 where an additional separation of catalyst or contact particles takes place. The separated catalyst particles are returned to the hopper 139 through line 152 which extends below the level 144 in the spent catalyst hopper 139.

The vapors or gases then pass through line 154 to a third cyclone separator 156 and additional catalyst or contact material which separates out but is returned through line 158 to the spent catalyst hopper 139 below the level 144 therein. The vapors or gases substantially free of catalyst particles leave the third cyclone separator 156 through line 162 and are passed to a suitable separation equipment such as fractionating equipment (not shown) to recover the desired products.

While cyclone separators have been shown in the drawing, it is to be understood that other forms of separating means may be used. In order to release the pressure from the spent catalyst hopper 139, a balance line 164 is provided which leads from the top of the hopper 139 to the outlet line 146 leading from the first cyclone separator 136.

If desired, fluidizing gas may be introduced into the separated catalyst or contact particles in the cyclone separator and in the dip pipes 142, 152 and 158 for fluidizing the separated catalyst so that it flows more readily. Fluidizing gas is also preferably introduced into the bottom of the spent catalyst hopper 139 through lines 166 for purging or stripping and fluidizing the catalyst particles therein. The catalyst or contact particles flow into standpipe 168 provided with fluidizing lines 172 for maintaining the particles in fluidizing condition in the standpipe so that they develop a hydrostatic pressure at the base of the standpipe 168. The standpipe 168 is provided with a shut-off valve 174 and a control slide valve 176 for controlling the rate of withdrawal of spent catalyst from the spent catalyst hopper 139.

Regenerating gas, such as air or other oxygen-containing gas is introduced through line 178 for admixture with the spent catalyst or contact particles leaving the bottom of the standpipe 168 below the control valve 176 and the less dense mixture is passed through line 182 into the bottom of the regeneration vessel 124 below the distribution plate 184 therein. In the regeneration vessel 124 the catalyst particles are maintained as a relatively dense mixture by controlling the velocity of the regenerating gas passing upwardly through the regeneration vessel 124. The average concentration of the catalyst in the regeneration vessel 124, when using synthetic silica alumina gel or acid-treated bentonite clay, is about 5 lbs./cu. ft. to 40 lbs./cu ft. The rest of the regeneration operation will be presently described.

Returning now to the reaction vessel 122, my invention is concerned with controlling the operation to maintain substantially constant operating conditions. A temperature responsive device is preferably located at 192 in the conical inlet 193 to the reaction vessel 122 below distribution plate 132. However, the thermocouple 192 may be arranged above plate 132 in the dense fluidized catalyst mixture shown at 133. This temperature responsive device, such as a thermocouple 192 is connected by means 194 to a control device 196 which is connected through diagrammatically shown means 198 to a control slide valve 202 at the bottom of the regenerated catalyst standpipe 126. This control is provided to maintain the temperature substantially constant in the reaction vessel 122. The control device 196 may be of the same type as device 64 hereinbefore described in connection with Fig. 1.

If the temperature decreases, the temperature control device 196 actuates the control slide valve 202 and more hot regenerated catalyst or contact particles are passed through line 130 and into the reaction vessel 122. As more catalyst or contact particles are introduced into the reaction vessel 122 more catalyst or contact particles go overhead through line 134 and into the spent catalyst hopper 139.

As the level 144 increases in the hopper 139, the level control device 204 controls the control slide valve 176 on the spent catalyst standpipe 168 through means 206 and in this way the level in the spent catalyst hopper 139 is maintained substantially constant. The level control device 204 may be of a type similar to device 68 above described in connection with Fig. 1.

If the temperature rises above the desired level in the reaction vessel 122, less catalyst or contact particles are passed through line 130 by control valve 202 into the reaction vessel 122 and the level 144 in the spent catalyst hopper will fall. The level responsive or control device 204 then shuts off the control slide valve 176 to a certain extent and less catalyst or contact particles are withdrawn from the spent catalyst hopper 139 to maintain the level substantially as shown at 144.

Returning now to the regeneration step, the contaminated catalyst particles which are to be regenerated contain burnable deposits and the regeneration is an exothermic reaction. It is necessary to control the temperature during regeneration to prevent temperatures higher than above 1150 or 1200° F. to prevent deactivation of the catalyst particles. The control may be effected in various ways. One way of controlling the temperature is to have an indirect heat exchange device 208 arranged in the dense mixture of catalyst particles undergoing regeneration in the regeneration vessel 124. The heat exchange coil has an inlet 209 and an outlet 210 for circulating any desired heat exchange medium such as water, fused salts, diphenyl, etc.

The regeneration gases, together with regenerated catalyst or contact particles, pass overhead from the regeneration vessel 124 through line 212 to the first cyclone separator 214 where most of the catalyst particles are removed from the regeneration gases. The separated catalyst or contact particles are passed into a regenerated catalyst hopper 216 through dip pipe 218 which extends below the level 222 of catalyst or contact particles in the hopper 216. The regeneration gases leave the first cyclone separator through line 224 and are passed to a second cyclone separator 226 provided with a dip pipe 228 which extends below the level 222 of catalyst in the hopper 216. The regeneration gases leave the second cyclone separator 226 through line 232 and are passed to a third cyclone separator 234 having a dip pipe 236 which extends below the level 222 of catalyst or contact particles in the hopper 216.

The regeneration gases leave the third cyclone separator through line 238 and may be passed through a waste heat boiler to recover heat from the regeneration gases and the cooled regeneration gases may then be passed to other suitable separation equipment, such as an electrical precipitator, water or oil scrubber (not shown), for separating or recovering further amounts of catalyst or contact particles from the regeneration gases.

To prevent the pressure from building up in the regenerated catalyst hopper 216, balance line 242 is provided which leads from the top of the hopper 216 to the outlet line 224 leading from the first cyclone separator 214.

The hopper 216 is provided with inlet lines 244 in its lower portion for introducing fluidizing gas to the regenerated catalyst or contact particles in the hopper. The fluidized regenerated catalyst, which may be at a temperature of about 1000° to about 1200° F., flows into the standpipe 126 hereinbefore described. Fluidizing lines 246 are provided for introducing fluidizing gas at spaced intervals along the standpipe 126 to maintain the catalyst particles in a fluidized condition whereby the particles assume some of the characteristics of a liquid and hydrostatic pressure is built up at the base of the standpipe 126 which is utilized for moving the regenerated catalyst particles through the reaction vessel 122 and the rest of the equipment. Standpipe 126 is provided with a shut-off valve 248.

A specific example of catalytic cracking of hydrocarbons will now be given to more specifically bring out the manner in which my invention is used to control operation of the unit to maintain substantially constant operating conditions. A gas oil having an A. P. I. gravity of about 31° and having an initial boiling point of 450° F. and a final boiling point of 800° F. is passed through indirect heat exchanger 14 where its temperature is raised to about 400° F. It is necessary in both forms of the invention shown in the drawings and using the control means there shown, that the oil entering the cracking unit be preheated to a selected constant temperature during the process. Hot regenerated catalyst at a temperature of about 1075° F. and comprising synthetic silica alumina gel is mixed with the preheated oil in line 18. About 18 parts of catalyst to one part of oil by weight are used.

The temperature at the inlet 25 to the reaction vessel 20 at point 58 should be maintained at about 970° F. The velocity of the upflowing vapors is selected to maintain a level 34 at about the level indicated in Fig. 1 of the drawing. The time of residence of the vapors in the reaction vessel 28 is about 26 seconds. The contact time in other examples may vary from about 5 to 100 seconds.

Spent catalyst is withdrawn from standpipe 72 and passed to the regeneration vessel 88 where the temperature during regeneration is maintained at about 1075° F.

With the conditions as above given, the gas oil is cracked to produce about 47% by volume of gasoline having an octane number by A. S. T. M. method of about 80. Also produced are 45% by volume of gas oil that may be sold as such or recycled to the process. The balance will consist of carbonaceous catalyst deposit and light hydrocarbon gases, both saturated and unsaturated.

If during the operation of the apparatus described above the regenerator temperature should drop from 1075° to 1070° F. due to some disturbance in the process, an increase in catalyst rate will occur due to the control means 64 attempting to maintain a constant reactor temperature. Since an increase in catalyst rate will result in higher catalytic activity in the reactor 20, a greater carbon formation will occur. This, in in turn, will add more fuel to the unit and since the only outlet for excess heat consists of the rejection of hotter flue gases from the regenerator, the temperature of the regenerator will tend to increase, thereby restoring the unit to its former temperature level of 1075° F. and the former catalyst to oil ratio. By this means, the operation of the unit is automatically stabilized and uniform operating conditions are readily maintained.

The method of controlling a catalytic cracking unit according to my invention operates quickly and satisfactorily. The temperature responsive device at point 58 immediately is affected by changes in temperature and the control slide valve 56 in the regenerated catalyst standpipe 52 is immediately actuated by changes in the temperature at the point 58. The level controller 68 acts immediately when the level 34 changes due to any change in the addition of regenerated catalyst to the reaction vessel 20 and the level control in turn immediately controls or actuates the valve 82 on the spent catalyst standpipe 72. From this it will be seen that the two parts of the control cooperate to maintain the unit operating at the desired conditions.

From the specific example given in connection with Fig. 1, it will be apparent that the operation of the apparatus shown in Fig. 2 is also easily and quickly controlled.

Broadly, my invention provides a method of maintaining the reactor temperature substantially constant by varying the catalyst circulation between the reactor and the regenerator as the temperature in the regenerator varies. With the oil feed being maintained substantially constant and the temperature of the preheated oil feed substantially constant, changing the catalyst circulation rate results in different catalyst to oil ratios and this results in deposition of different amounts of coke on the catalyst, higher catalyst to oil ratios forming more coke than lower catalyst to oil ratios.

When the regenerator temperature tends to go up, the catalyst circulation is decreased and this results in lower catalyst to oil ratios with less coke formed and less heat produced in the regenerator on burning, so that regenerator temperature goes down.

When the regenerator temperature tends to go down, the catalyst circulation is increased and this results in higher catalyst to oil ratios with more coke formed and more heat produced in the regenerator on burning so that regenerator temperature goes up.

The form of my invention shown in the drawing is the preferred form. As an alternative, the temperature of the reactor may be maintained constant by controlling the rate of withdrawal of spent catalyst from the reactor and the level of catalyst in the reactor may be maintained constant by controlling the rate of withdrawal of regenerated catalyst from the regenerator. The temperature in the reactor is used to control a valve in the spent catalyst withdrawal line passing to the regenerator and a level controller in the reactor controls a valve in the regenerated catalyst withdrawal line passing to the reactor.

With this alternative form, if the regenerator temperature tends to go up, the amount of spent catalyst being withdrawn from the reactor and passing to the regenerator is reduced. As less spent catalyst is withdrawn from the reactor, the level controller will function to reduce the opening of the valve in the regenerated catalyst withdrawal line and less regenerated catalyst will be introduced into the reactor. This results in smaller catalyst to oil ratio going to the reactor and less coke is formed in the reactor. As there is less coke on the spent catalyst introduced into the regenerator, there will be less coke in the regenerator and less heat produced in the regenerator. The regenerated catalyst particles will then be heated to a lower temperature and these particles being introduced into the reactor result in a lower reactor temperature.

If the regenerator temperature tends to go down, the amount of regenerated catalyst passing to the reactor is increased and this increases catalyst to oil ratio forming more coke. As the temperature in the reactor tends to go down, the amount of spent catalyst withdrawn from the reactor and passing to the regenerator is increased. The level of catalyst is maintained in the reactor by controlling the amount of regenerated catalyst withdrawn from the regenerator.

My invention may be used with other processes using fluidized solids such as carbonization of coal, production of water gas from coal, distillation of wood, oil shale, or coal treatment of ores, such as reduction and roasting of various metal ores, drying of solids, oxidation of gases by various solid oxides, recovery of vapors from gases, recovery of gasoline constituents from natural gas, casing head gas or cracked refinery gas, organic reactions involving oxidation, reduction, chlorination, hydration, dehydration, and the like, and more particularly, various hydrocarbon reactions wherein solid catalysts or treating or contacting agents may be employed, such as in cracking, reforming, hydrogenation, dehydrogenation, polymerization, alkylation, dealkylation, isomerization, aromatization, refining, desulfurization, synthesis of hydrocarbons from carbon monoxide and hydrogen, and the like.

While I have shown two forms of apparatus which may be used with my invention, it is to be understood that these are by way of illustration only and various changes and modifications may be made without departing from the spirit of my invention.

I claim:

1. In a catalytic conversion process wherein a reactant at a substantially constant rate and at a substantially constant temperature is introduced into a conversion zone and a regenerating gas is introduced into a regeneration zone and constant operating conditions are to be maintained in the conversion zone and contaminated catalyst particles from the conversion zone are withdrawn from the bottom portion of said conversion zone and are passed to a spent catalyst standpipe extending downwardly from said conversion zone and provided with a control valve and the particles are then regenerated in a regeneration zone and the catalyst particles at a temperature above conversion temperature are passed to a regenerated catalyst standpipe having a control valve, the improvement which comprises maintaining the temperature in the conversion zone substantially constant by controlling the amount of hot regenerated catalyst passing from said regenerated catalyst standpipe to said conversion zone to compensate for undesired changes in the temperature in said conversion zone while maintaining a substantially constant amount of catalyst in said conversion zone by controlling separately the amount of spent catalyst withdrawn from said spent catalyst standpipe.

2. In a catalytic conversion process wherein hydrocarbon fluid and hot regenerated catalyst particles are introduced through a common inlet into a conversion zone and a regenerating gas and contaminated catalyst particles are introduced into a regeneration zone and constant operating conditions are to be maintained in the conversion zone in which the catalyst particles are maintained as a dense fluidized bed with a dilute phase thereabove and contaminated catalyst particles are withdrawn directly from the dense bed as a dense mixture and passed to a spent catalyst standpipe and the contaminated catalyst particles are then passed to said regeneration zone wherein they are maintained as a dense fluidized bed with a dilute phase thereabove and the hot regenerated catalyst particles at a temperature materially higher than conversion temperature are withdrawn directly from the dense bed as a dense mixture and are passed to a regenerated catalyst standpipe, the improvement which comprises maintaining the temperature in said conversion zone substantially constant by controlling the amount of hot regenerated catalyst passing from said regenerated catalyst standpipe to said conversion zone in response to the temperature in said common inlet while maintaining the level of the dense bed in said conversion zone substantially constant by controlling the amount of catalyst withdrawn from said conversion zone in the dense phase.

3. A process according to claim 2 wherein the temperature in said conversion zone is maintained substantially constant by controlling the amount of hot regenerated catalyst passing to said conversion zone in response to the temperature of the regenerated catalyst particles and hydrocarbon mixture passing to the lower portion of said conversion zone.

4. In a catalytic conversion process wherein a reactant and catalyst particles are introduced into a conversion zone and a regenerating gas and spent catalyst particles are introduced into a regeneration zone and constant operation conditions are to be maintained in the conversion zone in which the particles are maintained as a dense fluidized bed with a dilute phase thereabove and contaminated or spent catalyst particles are withdrawn directly from the dense bed as a dense mixture and passed to a spent catalyst standpipe and the contaminated catalyst particles are then passed to a regeneration zone wherein they are maintained as a dense fluidized bed with a dilute phase thereabove and the hot regenerated catalyst particles at a temperature materially higher than conversion temperature are withdrawn directly from the dense bed as a dense mixture and are passed to a regenerated catalyst standpipe, the steps of compensating for undesirable changes in temperature in said conversion zone by changing the rate of feed of hot regenerated catalyst passing from said regenerated catalyst standpipe to said conversion zone and separately changing the rate of withdrawal of contaminated catalyst from said conversion zone to maintain the level of the dense bed in said conversion zone substantially constant.

5. A process according to claim 4 wherein the reactant comprises hydrocarbon fluid and the conversion zone comprises a cracking zone having a common inlet for hydrocarbon fluid and catalyst particles and the rate of feed of hot regenerated catalyst particles passing to said cracking zone is in response to the temperature in said common inlet.

6. In an apparatus of the character described including a regenerator, a reactor, means including a standpipe having a control valve for passing hot regenerated catalyst from said regenerator to said reactor, means including a spent catalyst standpipe for passing spent catalyst from said reactor to said regenerator, an inlet for feeding reactant into said reactor, an outlet for regeneration gases from said regenerator, the improvement including control means for controlling the temperature in said reactor, said control means including a thermocouple associated with said reactor, means connecting said thermocouple with the control valve in said regenerated catalyst standpipe to control the amount of hot regenerated catalyst passing from said regenerated catalyst standpipe to said reactor and a control device for maintaining the amount of catalyst substantially constant in said reactor.

7. In a catalytic conversion process wherein a reactant and catalyst particles are introduced into a conversion zone and a regenerating gas and contaminated catalyst particles are introduced into a regeneration zone and constant operating conditions are to be maintained in the conversion zone in which the catalyst particles are maintained in a dense fluidized bed and contaminated catalyst particles are withdrawn from said conversion zone and passed to a spent catalyst collecting zone and the contaminated catalyst particles are then passed to said regeneration zone wherein they are maintained as a dense fluidized bed and the hot regenerated catalyst particles at a temperature materially higher than conversion temperature are withdrawn from said regeneration zone and passed to a regenerated catalyst collecting zone and in which process the reactant is fed at a substantially constant rate and at a substantially constant initial temperature, the improvement which comprises maintaining the temperature in said conversion zone at a desired substantially constant level by controlling the amount of hot regenerated catalyst passing from said regenerated catalyst collecting zone into said conversion zone while maintaining a substantially constant desired amount of catalyst in said conversion zone so that if the conversion temperature unintentionally decreases more hot regenerated catalyst from said regenerated catalyst collecting zone is passed into said conversion zone and more of the contaminated catalyst is removed from said conversion zone and passed to said spent catalyst collecting zone and then to said regeneration zone, and if the conversion temperature unintentionally increases less hot regenerated catalyst is passed from said regenerated catalyst collecting zone into said conversion zone and less of the contaminated catalyst is removed from said conversion zone and passed to said spent catalyst collecting zone and then to said regeneration zone.

8. A method according to claim 7 wherein said spent catalyst collecting zone includes a standpipe and said regenerated catalyst collecting zone includes a standpipe, each standpipe extending downwardly from its respective zone.

9. A method according to claim 7 wherein said spent catalyst collecting zone includes a hopper and a standpipe extending from the bottom of said hopper and said regenerated catalyst collecting zone includes a second hopper and a second standpipe extending from the bottom of said second hopper.

10. In a catalytic conversion process wherein a reactant and catalyst particles are introduced into a conversion zone and a regenerating gas and contaminated catalyst particles are introduced into a regeneration zone and constant operating conditions are to be maintained in the conversion zone in which the catalyst particles are maintained in a dense fluidized bed and contaminated catalyst particles are withdrawn from said conversion zone and passed to a spent catalyst collecting zone and the contaminated catalyst particles are then passed to said regeneration zone wherein they are maintained as a dense fluidized bed and the hot regenerated catalyst particles at a temperature materially higher than conversion temperature are withdrawn from said regeneration zone and passed to a regenerated catalyst collecting zone and in which process the reactant is fed at a substantially constant rate and at a substantially constant initial temperature, the improvement which comprises maintaining the temperature in said conversion zone at a desired substantially constant level and compensating for undesired changes in the temperature in said conversion zone by controlling the amount of hot regenerated catalyst passing from said regenerated catalyst collecting zone into said conversion zone in response to the temperature in a selected low point in the dense bed in said conversion zone while maintaining a substantially constant amount of catalyst in said conversion zone.

11. In an apparatus of the character described including a regenerator having an outlet for regeneration gases and an inlet for regenerating gas and catalyst, a reactor having an outlet for reaction products and an inlet for reactants and catalyst, means including a standpipe for passing hot regenerated catalyst from said regenerator to said reactor inlet, said standpipe having a control means, means including a spent catalyst standpipe for passing spent catalyst from said reactor to said regenerator inlet, the improvement including means for controlling the temperature in said reactor, said control means including a thermocouple arranged in said reactor inlet and responsive to the temperaure of the reactant and regenerated catalyst passing therethrough and connected to operate said control means in said regenerated catalyst standpipe to control the amount of hot regenerated catalyst passing from said regenerated catalyst standpipe to said reactor inlet and means for maintaining the amount of catalyst substantially constant in said reactor.

12. In an apparatus of the character described including a regenerator having an outlet for regeneration gases and an inlet for regenerating gas and catalyst and adapted to hold a dense bed of catalyst, a reactor having an outlet for reaction products and an inlet for reactants and catalyst and adapted to hold a dense bed of catalyst, means including a standpipe for passing hot regenerated catalyst from said regenerator to said reactor inlet, said standpipe having a control means, means including a spent catalyst standpipe for passing spent catalyst from said reactor to said regenerator inlet, the improvement including means for controlling the temperature in said reactor, said control means including a thermocouple associated with said reactor and responsive to the temperature of the reactant and regenerated catalyst in said reactor inlet and means connecting said thermocouple and said control means in said regenerated catalyst standpipe to control the amount of hot regenerated catalyst passing from said regenerated catalyst standpipe to said reactor and means for maintaining the level of catalyst substantially constant in said reactor.

13. In a hydrocarbon catalytic cracking process wherein hydrocarbon fluid and hot regenerated catalyst particles are introduced into a cracking zone through a common inlet and contaminated catalyst particles are introduced into a regeneration zone and constant operating conditions are to be maintained in said cracking zone in which the catalyst particles are maintained as a dense fluidized bed with a dilute phase thereabove and contaminated catalyst particles are withdrawn directly from the dense bed as a dense mixture and passed to a spent catalyst standpipe and the contaminated catalyst particles are then passed to said regeneration zone wherein they are maintained as a dense fluidized bed with a dilute phase thereabove and the hot regenerated catalyst particles at a temperature materially higher than cracking temperature are withdrawn directly from the dense bed as a dense mixture and are passed to a regenerated catalyst standpipe, the improvement which comprises controlling the temperature in said cracking zone by controlling the amount of hot regenerated catalyst passing from said regenerated catalyst standpipe to said cracking zone in response to the temperature in said common inlet while maintaining the level of the dense bed in said cracking zone substantially constant by controlling the amount of catalyst withdrawn from said cracking zone in the dense phase.

14. In a catalytic conversion process wherein a reactant and catalyst particles are introduced into a conversion zone and a regenerating gas and contaminated catalyst particles are introduced into a regeneration zone and constant operating conditions are to be maintained in the conversion zone in which the catalyst particles are maintained in a dense fluidized bed and contaminated catalyst particles are withdrawn from said conversion zone and passed to a spent catalyst collection zone and the contaminated catalyst particles are then passed to said regeneration zone wherein they are maintained as a dense fluidized bed and the hot regenerated catalyst particles at a temperature materially higher than conversion temperature are withdrawn from said regeneration zone and passed to a regenerated catalyst collecting zone and in which process the reactant is fed at a substantially constant rate and at a substantially constant initial temperature, the improvement which comprises maintaining the temperature in said conversion zone at a desired substantially constant level by compensating for any undesired changes in temperature in said conversion zone by controlling the amount of hot regenerated catalyst passing from said regenerated catalyst collecting zone into said conversion zone while maintaining a sufficient amount of catalyst in said conversion zone to effect the desired conversion so that if the conversion temperature decreases for any reason more hot regenerated catalyst from said regenerated catalyst collecting zone is passed into said conversion zone and more of the contaminated catalyst is removed from said conversion zone and passed to said spent catalyst collecting zone and then to said regeneration zone, and if the conversion temperature increases for any reason less hot regenerated catalyst is passed from said regenerated catalyst collecting zone into said conversion zone and less of the contaminated catalyst is removed from said conversion zone and passed to said spent catalyst collecting zone and then to said regeneration zone.

15. A method according to claim 14 wherein said spent catalyst collecting zone includes a hopper and a standpipe extending from the bottom of said hopper and said regenerated catalyst collecting zone includes a second hopper and a second standpipe extending from the bottom of said second hopper.

16. An apparatus of the character described including a regenerator having an outlet for regeneration gases and inlet means for regenerating gas and catalyst, a reactor having an outlet for reaction products and inlet means for a reactant and catalyst, said reactor inlet means including a perforated distribution plate in the lower portion of said reactor, means for passing hot regenerated catalyst from said regenerator to said reactor inlet means and having control means, means for passing spent catalyst from said reactor to said regenerator inlet means, means for controlling the temperature in said reactor, said last-mentioned control means including a thermocouple adjacent said perforated plate in said reactor and responsive to the temperature of the reactant and regenerated catalyst and means for connecting said thermocouple with said first mentioned control means to operate said first mentioned control means to control the amount of hot regenerated catalyst passing to said reactor.

17. An apparatus of the character described including a regenerator having an outlet for regeneration gases and inlet means for regenerating gas and catalyst and adapted to hold a dense bed of catalyst, a reactor having an outlet for reaction products and a common inlet for reactants and catalyst and adapted to hold a dense bed of catalyst, said reactor being provided in its lower portion with a perforated distribution plate adjacent said reactor inlet, means including a standpipe for passing hot regenerated catalyst from said regenerator to said reactor inlet, said standpipe having control means, means including a spent catalyst standpipe for passing spent catalyst from said reactor to said regenerator inlet, means for controlling the temperature in said reactor, said last-mentioned control means including a thermocouple arranged in said reactor common inlet and responsive to the temperature of the reactant and regenerated catalyst, and means connecting said thermocouple with said standpipe control means to operate said control means in said regenerated catalyst standpipe and to control the amount of hot regenerated catalyst passing from said regenerated catalyst standpipe to said reactor.

CHARLES W. TYSON.

REFERENCES CITED

The following references are of record in the file of this patent:

UNITED STATES PATENTS

| Number | Name | Date |
|---|---|---|
| 1,616,547 | Pontoppidan | Feb. 8, 1927 |
| 2,239,801 | Voorhees | Apr. 29, 1941 |
| 2,253,486 | Belchetz | Aug. 19, 1941 |
| 2,271,148 | Becker et al. | Jan. 27, 1942 |
| 2,326,705 | Thiele et al. | Aug. 10, 1943 |
| 2,327,175 | Conn | Aug. 17, 1943 |
| 2,341,193 | Scheineman | Feb. 8, 1944 |
| 2,353,505 | Scheineman | July 11, 1944 |
| 2,360,787 | Murphree et al. | Oct. 17, 1944 |
| 2,366,372 | Voorhees | Jan. 2, 1945 |
| 2,367,281 | Johnson | Jan. 16, 1945 |
| 2,379,027 | Monro | June 26, 1945 |
| 2,387,309 | Sweeney | Oct. 23, 1945 |

FOREIGN PATENTS

| Number | Country | Date |
|---|---|---|
| 115,689 | Australia | Aug. 6, 1942 |
| 118,399 | Australia | Apr. 12, 1944 |
| 547,130 | Great Britain | Aug. 14, 1942 |